Aug. 7, 1923.

H. PEASE

BUNCHING MACHINE

Filed Sept. 2, 1922   6 Sheets-Sheet 3

1,464,332

INVENTOR
Henry Pease
by Wright Brown Quimby May
att'ys

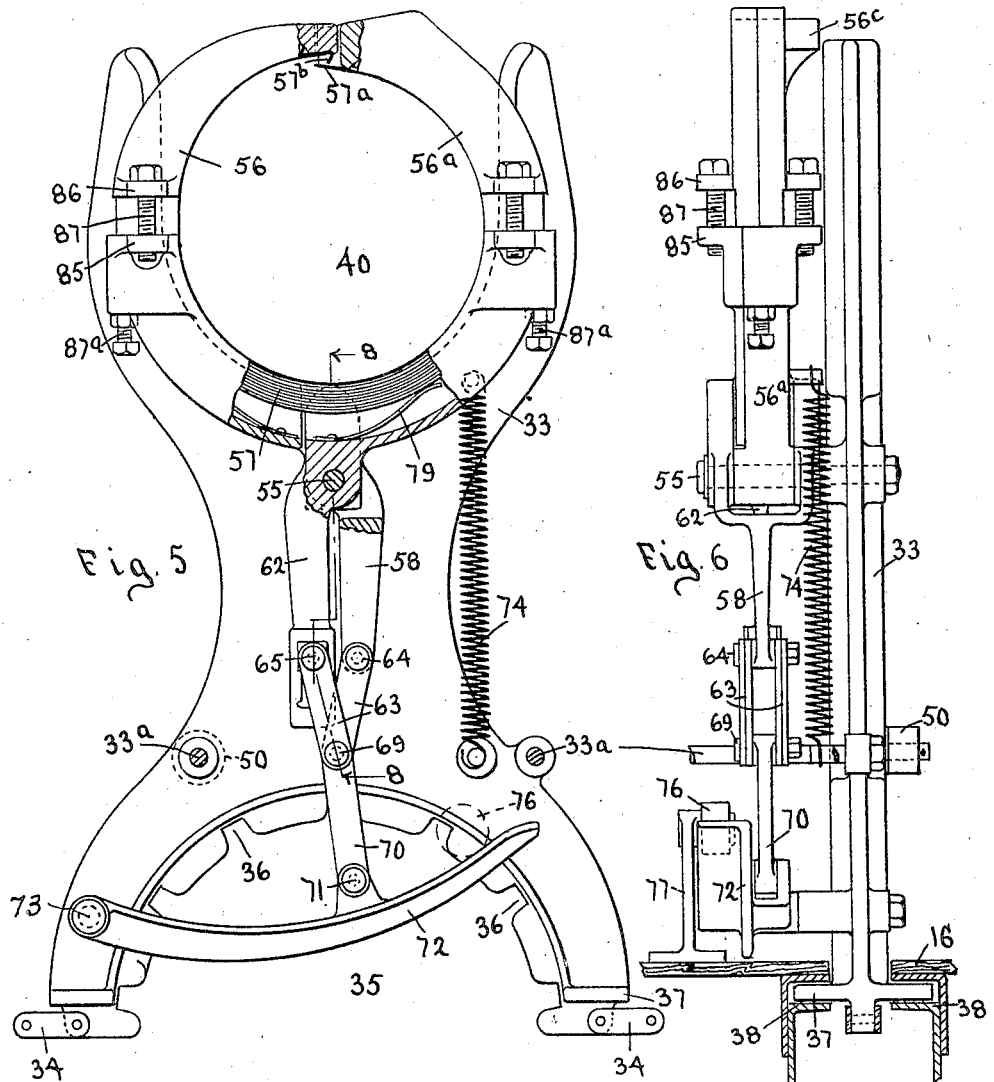

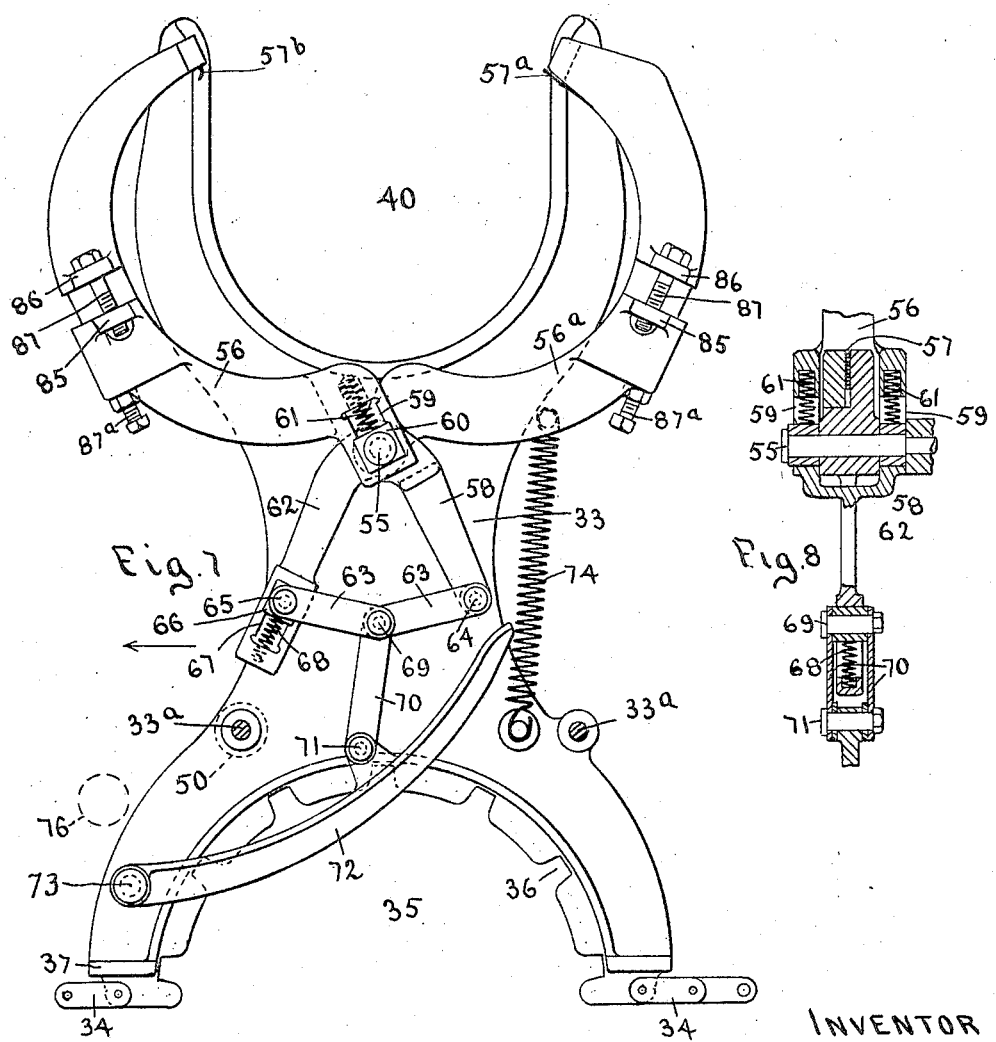

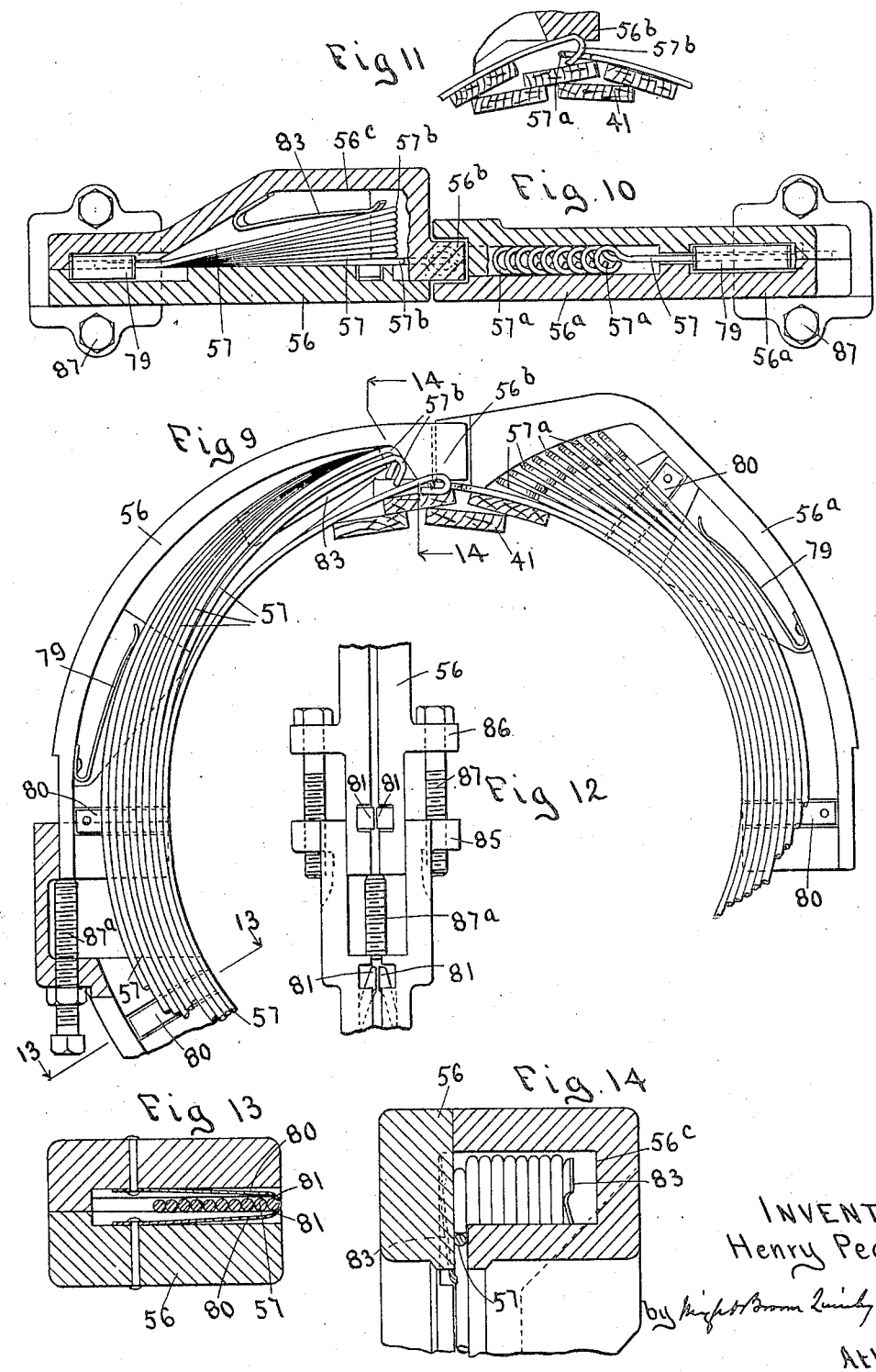

Patented Aug. 7, 1923.

1,464,332

UNITED STATES PATENT OFFICE.

HENRY PEASE, OF JACKMAN, MAINE.

BUNCHING MACHINE.

Application filed September 2, 1922. Serial No. 585,916.

*To all whom it may concern:*

Be it known that I, HENRY PEASE, a citizen of the United States, residing at Jackman, in the county of Somerset and State of Maine, have invented new and useful Improvements in Bunching Machines, of which the following is a specification.

The object of this invention is to provide a machine for bunching and binding together a group of units such as laths, in a saw mill or other establishment where the units are made, the machine being largely automatic in its operation, so that it may be run by a single operator, who is required only to start and stop the machine, and supply groups of lath thereto, the machine performing the duty of compressing the group into a circular bunch, positioning the laths endwise, binding the laths together to maintain the bunch, sawing off the end portions of the bunch to render the length of all the laths uniform, and delivering the completed bunch to a conveyor for transportation to a point of delivery.

The invention is embodied in the organization hereinafter described and claimed.

Of the accompanying drawings forming a part of this specification,—

Figure 1 is a side elevation of a bunching machine embodying the invention, parts being broken away and shown in section.

Figure 1ª is a fragmentary detail view.

Figure 5 is a side view of one of the benches, and of the compressing jaws accompanying the same, portions of the jaws being shown in section, and the jaws being closed.

Figure 6 is an edge view of the parts shown by Figure 5.

Figure 7 is a view similar to Figure 5, showing the jaws opened.

Figure 8 is a section on line 8—8 of Figure 5.

Figure 9 is a fragmentary view, showing portions of one of the pairs of jaws, and binding wires therein.

Figure 10 is a sectional view, showing parts shown by Figure 9.

Figure 11 is a fragmentary view, similar to a portion of Figure 9, showing a different stage of the operation.

Figure 12 is a fragmentary elevation of a portion of one of the jaws.

Figure 13 is a section on line 13—13 of Figure 9.

Figure 14 is a section on line 14—14 of Figure 9.

The same reference characters indicate the same parts in all of the figures.

Figure 1:
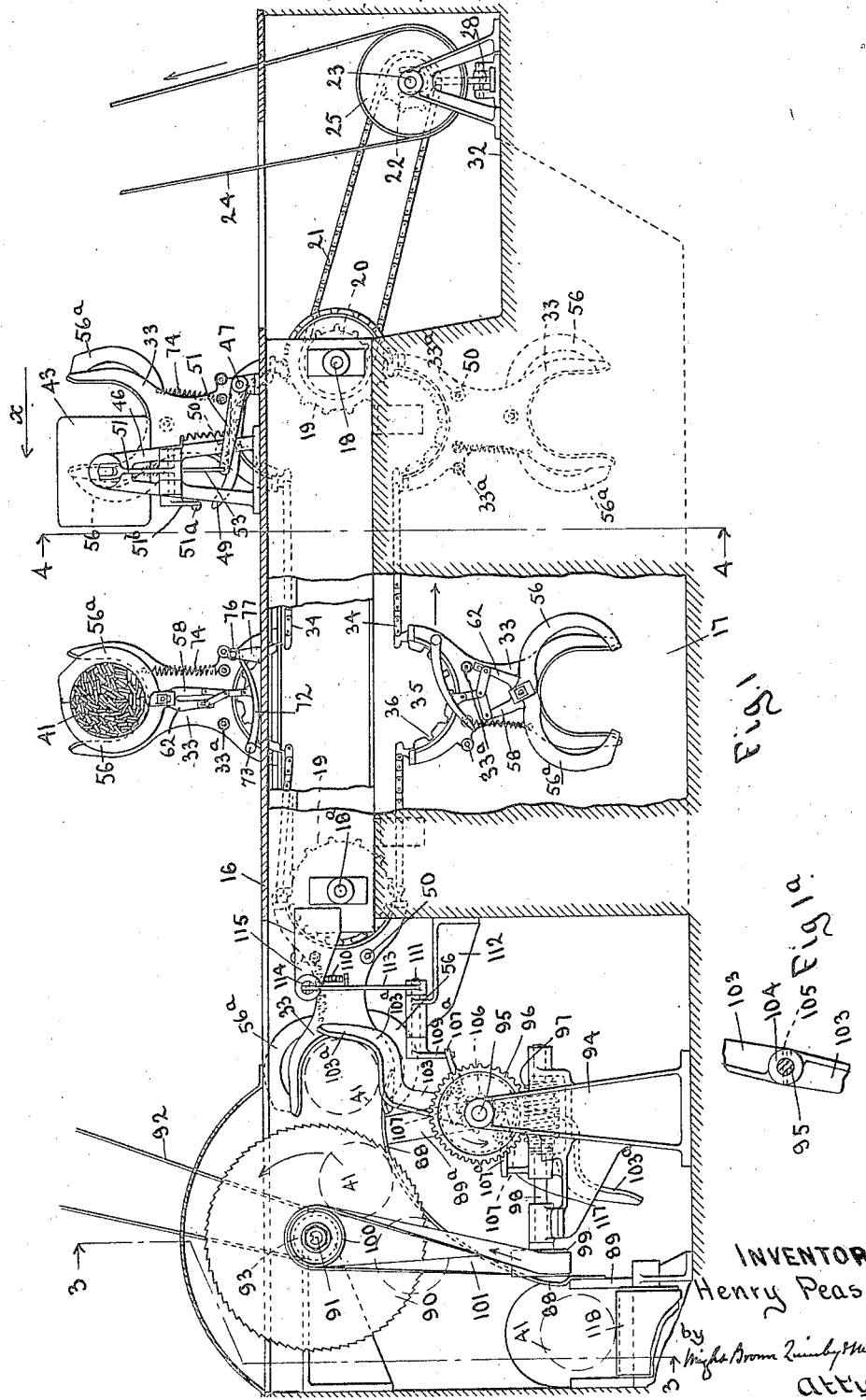

In the drawings, 16 designates a platform, which may be a portion of the flooring of a saw mill, and is located in suitable proximity to a sawing mechanism, adapted to produce laths, or other articles or units of like form. Beneath the platform is a pit 17, containing elements of the operating mechanism hereinafter described. Journaled in fixed bearings in the pit are two transversely extending spaced apart shafts 18 and 18ª, to which are fixed sprocket wheels 19.

Figure 2:
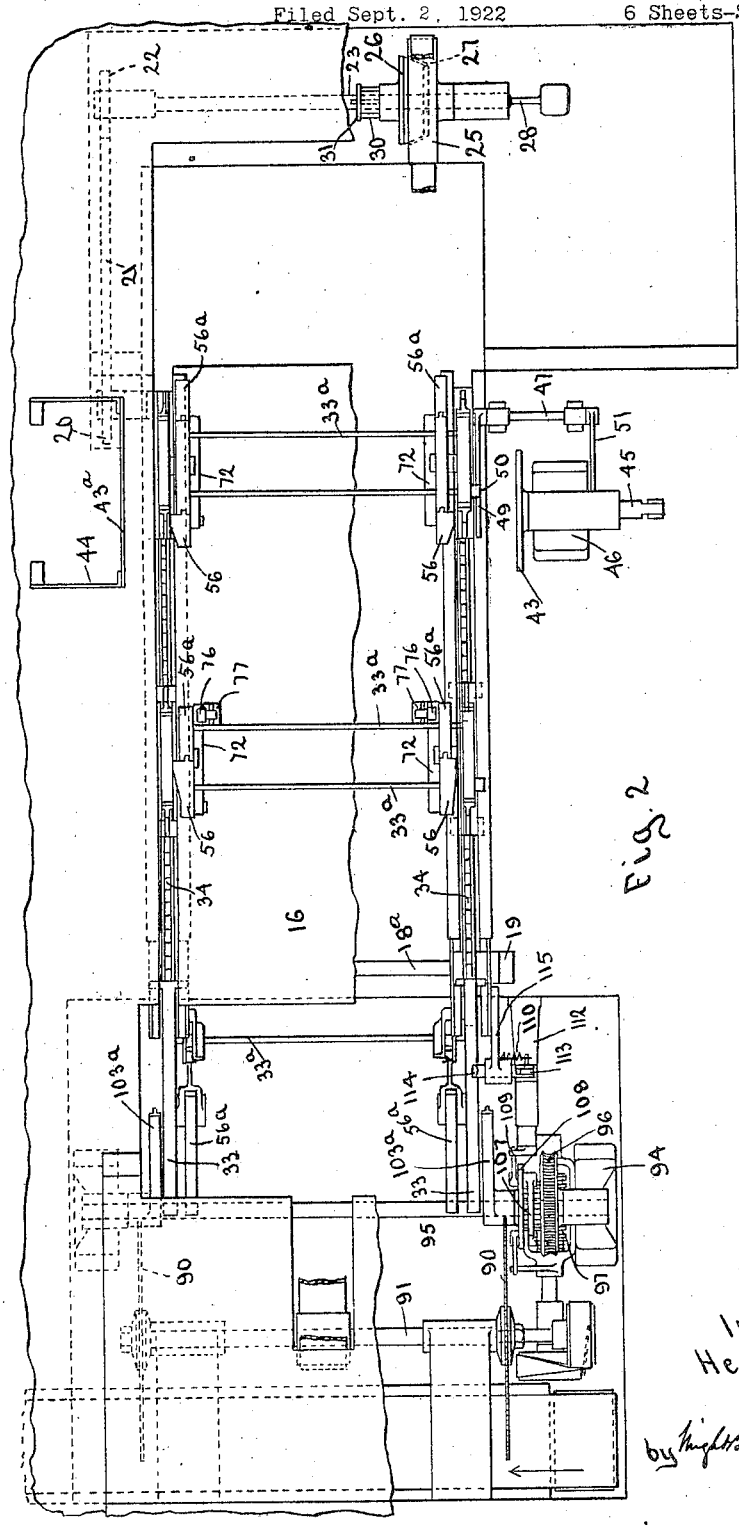
Figure 2 is a top plan view, parts being broken away.
Figure 4:
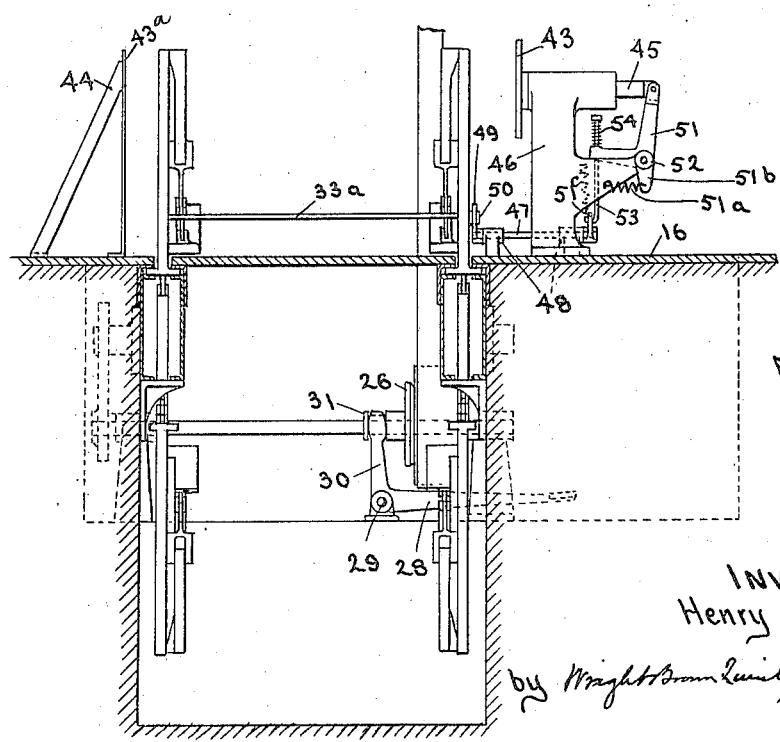
Figure 4 is a section on line 4—4 of Figure 1.

The shaft 18 is driven by a sprocket and chain connection 20, 21 and 22, with a driving-shaft 23 located at one end of the pit, and impelled by a belt 24, moving on a pulley 25, which is normally loose on the shaft, and is engageable therewith by a sliding clutch member 26, slidable on and rotatable with the shaft, and a member 27 (Figure 2) formed on the pulley. The clutch members are normally separated, and the sliding member 26 is movable into and out of engagement with the member 27, by a treadle 28 (Figure 4), pivoted at 29, and having a forked arm 30, engaged with the grooved hub 31 of the clutch member 26. The shaft 18ª is loosely journaled in its bearings.

The driving-shaft, clutch and treadle are in a portion of the pit which constitutes the station of an operator who stands on the floor 32, in position to operate the clutch, and thus start and stop the transmission of power from the driving-shaft through the sprocket chain 21.

Engaged with the sprocket wheels 19 are two endless chains, which include the bases hereinafter described of a series of benches 33, and sprocket chain sections 34, connecting the bench bases. The benches, best shown by Figures 5, 6 and 7, extend outward from the bases, which are formed by the inner ends of the benches, and by rigid arms projecting in opposite directions. The bases are provided with semi-circular recesses 35, in which are formed a series of notches 36, adapted to engage the teeth of the sprocket wheels 19. The benches are arranged in pairs, with the benches of each pair abreast of each other, said benches being rigidly connected by tie-rods 33ᵃ. The notched bases of the benches and the connecting chain lengths 34, constitute in effect endless sprocket chains having arched rigid portions, formed by the notched bases, and flexible intermediate portions formed by the chain sections 34, the arrangement being such that, as shown by Figure 1, some of the benches stand vertically above the platform 16, others stand vertically projecting downward into the pit, and others stand horizontally as shown at the left in Figure 1.

The benches are provided with ears or runners 37 (Figure 6), adapted to slide in horizontal guides 38, just below the platform 16, said guides supporting the upstanding benches, so that while sliding on the guides, they are prevented from tipping. The outer ends of the benches have U-shaped recesses 40, adapted to receive a group of laths 41.

When the above-mentioned endless chains are driven, the benches move in an endless path. The notched bases of the benches successively engage the sprocket wheels 19, and pass partly around the same. The upstanding benches are supported by the guides in position to receive laths, which are deposited in groups of a predetermined number by the operator, in the recesses 40 of the pair of unstanding benches shown at the right in Figure 1, the group being supported by the two benches of the pair.

With each pair of benches are associated compressing jaws, which act to compress the groups in the upstanding benches, and are adapted to hold binding wires and secure the same to the compressed groups, so that when each pair of benches assumes a horizontal position, the laths carried thereby are bound together or bunched preparatory to removal from the benches, and presentation to cutting-off saws, whereby the ends of the group are evenly trimmed.

The movement of the benches is in the direction indicated by the arrow $x$ (Figure 1). The movement is arrested by the operator when the benches of the first upstanding pair are nearly in position to cooperate with a ram 43, which strikes one end of a loose group of laths deposited in the bench recesses 40, and forces the units of the group endwise toward a fixed gage plate 43ᵃ the ram and gage plate being at opposite sides of the series of benches. The ram is fixed to a rod 45, which is movable in a guide in a fixed standard 46, and is normally retracted. To project the ram I provide mechanism including a rock-shaft 47, journaled in fixed bearings 48, an arm 49, fixed to the rock-shaft, a stud 50, projecting laterally from one of the benches, and arranged to pass over and depress the arm 49, and thus turn the rock-shaft in its bearings, an arm 51, also fixed to the rock-shaft, a bell-crank lever 51, fulcrumed at 52, one arm of the lever being loosely connected with the ram rod 45, and rod 53, connecting the rock-shaft arm 51ᶜ with the other arm of the lever 51. The arrangement is such that when a pair of benches bearing a group of laths moves between the ram and the gage plate, the ram is quickly projected or moved forward by said mechanism, and the laths are forced endwise toward the gage plate, the ends of the longer laths being arrested by the gage plate, and the opposite ends of all the laths being left flush with each other by the ram.

A spring 54 (Figure 4) interposed between a head on the rod 53, and an arm of the lever 51 exerts a yielding pressure on the lever 51, the rod 53 being movable in an orifice in said lever. The ram may be retracted by any suitable means, such as a spring 51ᵃ (Figure 4) attached at one end to an ear 51ᵇ on the lever 51, and at the other end to the standard 46.

Mounted to swing on a fixed pivot-stud 55 on each bench, are two substantially semi-circular compressing jaws 56 and 56ᵃ, adapted to compress a group of laths supported by the binders. Said jaws are preferably hollow, and collectively constitute a magazine adapted to hold a plurality of binding wires 57, and close said wires on the compressed group, and interengage the ends of the wires as hereinafter described. The jaws are formed to impart a circular form to a group of laths when closed thereon, as shown by Figure 1. The jaw 56 is provided with an arm 58, having slots 59, which receive blocks 60, adapted to turn on the pivot-stud 55, the jaw 56 being normally held in the raised position shown by Figures 5 and 7, by springs 61 (Figure 8) above the blocks 60, said springs holding the lower ends of the slots 59 against the lower sides of the blocks 60. The jaw 56 is thus adapted to be moved inwardly by the mechanism provided, as hereinafter described, for closing the jaws on a group of laths. The jaw 56ᵃ is provided with an arm 62, which swings without moving endwise on the pivot-stud 55. The arms 58 and 62 are crossed, and their lower ends are connected with toggle links 63, one of which is pivoted at 64 to the arm 58, the other being pivoted at 65 to a block 66, which is slidable in a slot 67 in the arm 62. The block is normally held by a spring 68 in the raised position shown by Figure 7. Said spring is below the block 66, and provides a yielding connection between the said block, the arm 62, and one of the toggle links 63 next described.

The meeting ends of the toggle links 63 are pivoted at 69 to a link 70, which is pivoted at 71 to a curved arm 72 said arm being pivoted at 73 to the bench. The jaws are normally held separated as shown by Figure 7, by a spring 74, connecting the jaw 56ª with the bench, and acting through the said links on the jaw 56. The spring 68 permits a slight yielding of the jaw 56ª in case the diameter of the bunch is such as to require this. The spring 74 maintains the toggle links in the relative positions shown by Figure 7, the free end of the arm 72 being elevated. The arm is depressed to close the jaws by a stud 76 on a standard 77 (Figure 1) fixed to the floor 16, said stud being arranged to depress the lever when the latter passes under the stud, and thus close the jaws as shown by Figures 1 and 5.

As above stated, each jaw is hollow. The cavities of the two jaws open into each other, as indicated by Figure 5, and are formed to contain a group of the above-mentioned binding wires 57. One of the free ends of each wire is provided with an eye 57ª, and the other free end is provided with a hook 57ᵇ. The major portions of the wires are arranged side by side in the magazine, as shown by Figure 13, and are pressed inward by radially acting springs 79. Side springs 80 (Figure 13), arranged in pairs, bear on opposite sides of the group of wires, and have inwardly curved free ends 81, which yieldingly retain the inner wire in the magazine, said springs yielding to permit the withdrawal of the inner wire from the magazine. When the jaws are closed, the hook 57ᵇ of the inner wire is moved to position to enter the eye 57ª of the same wire, as shown by Figure 5.

The entrance of the hook into the eye is followed by the binding of the hook into interengagement with the eye, as indicated by Figures 11 and 9, this binding and interengagement being caused as explained hereinafter, so that the hook is first partly bent as shown by Figure 11, and then fully bent as shown by Figure 9. The jaw 56ª has a thickened head 56ᵇ, which exerts inward pressure on the hook, when the latter is being engaged with the eye.

As shown by Figure 10, the jaw 56 has a recessed portion 56ᶜ, receiving the hooked free end portions of the wires, and containing a side spring 83, which presses said ends toward the head 56ª, these end portions of the wires being laterally inclined, so that the hook of each wire stands beside the hook of the next wire.

The separation of the jaws, as in Figure 7, causes the hook of the inner wire to slip forward under the head 56ᵇ, preparatory to being pressed inward by the latter when the jaws are closed, as in Figures 5 and 9. It will be seen by reference to Figure 5, that the jaws are closed before the free end of the arm 72 passes from under the stud 76, so that the arm is additionally depressed by the stud after the jaws are closed. This additional depression moves the jaw 56 inward or downward from the position shown by Figures 5 and 11, to that shown by Figure 9, and causes the head 56ᵇ to act as described on the hook of the inner wire. This downward movement is permitted by the springs 68 which yieldingly support the jaw 56 in a raised position.

Each of the compressing jaws is preferably composed of an inner section having ears 85, and an outer section having ears 86. The outer section is slidable on the inner section, to vary the length of the jaw, and is adjustably confined by bolts 87 having heads bearing on the ears 86, and threaded portions engaging tapped orifices in the ears 85. A stop bolt 87ª engaged with one section, bears on a shoulder in the other section, as shown by Figures 9 and 12.

When a pair of benches reaches the horizontal position shown at the left in Figure 1, the movement of the chain of benches is arrested, and the horizontal benches are rigidly supported by the engagement of their notched inner ends with two of the sprocket wheels 19, these wheels being at rest. These benches contain a group or bunch of laths which are bound together by wires 57. While the benches are at rest, the bunch of laths is slowly ejected therefrom upon the free end portions of curved guides 88, which are attached to fixed supports 89 and 89ª (Figure 1), and are arranged to guide the bunch across a pair of cutting-off saws 90, fixed to a shaft 91, and driven by a belt 92, running on a pulley 93, fixed to the shaft.

The bunch of laths is ejected from the horizontal benches by the mechanism next described.

Figure 3:
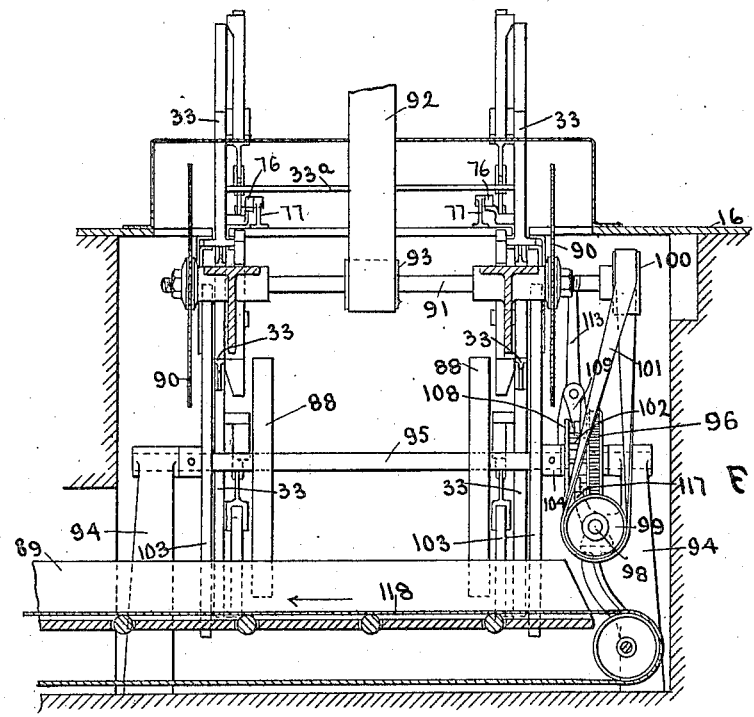
Figure 3 is a section on line 3—3 of Figure 1.

Journaled in bearings in fixed standards 94 (Figures 1 and 3) is a shaft 95. Continuously rotated at a relatively slow rate on the shaft 95, is a worm gear 96, which is loose on the shaft, said gear being rotated by a worm 97, fixed to a shaft 98, journaled in bearings on one of the standards 94, and connections between the shaft 98 and the saw shaft 91, including a pulley 99 on the shaft 98, a pulley 100 on the saw shaft, and a crossed belt 101 connecting said pulleys.

Fixed to the shaft 95 are two duplicate pairs of arms 103, each pair having a hub 104 (Figure 1ª) secured to the shaft. The arms 103 project in opposite directions from the hub, and each arm has an angular outer end portion 103ª, formed to engage a bunch of laths in the horizontal benches, and eject the bunch from the benches, and force it against the saws. Said ejecting mechanism includes automatic means operable by the benches when they approach their horizontal delivering position, for connecting the arm-carrying shaft 95 with the continuously rotating worm gear 96, and causing a half rotation of the shaft, thereby moving one pair of arms forward to eject a bunch of laths, and force it against the saws, and locate the other pair in position to eject a bunch from the next pair of benches reaching a delivering position, the shaft and arms being then arrested.

Included in said automatic means is a ratchet 106 (Figure 1), fixed to the worm gear 96, and a pair of pawls 107, pivoted to a disk 108, which is fixed to the shaft 95. The said gear is rotated in the direction indicated by the arrow marked thereon in Figure 1, and the ratchet and pawls are so formed that when either pawl engages the ratchet, the shaft is rotated by the worm gear, and the arms 103 are revolved in the same direction. Each pawl has a tail piece 107$^a$. A stop arm 109 is normally held by a spring 110 (Figure 1), in position to bear on the tail piece of the higher pawl, and hold the pawl out of engagement with the ratchet 106. The stop arm 109 is fixed to a rock-shaft 111, journaled in a bearing on a fixed bracket 112, and provided with an upwardly projecting arm 113, the upper end of which is pivoted to a plunger 114, movable in a guide on a fixed bracket 115. The plunger is normally held by the spring 110 in the path of a bench 33, when the bench is approaching its delivering position, so that the bench in swinging downward to said position, moves the plunger, the arm 113, the rock-shaft 111, and the stop arm 109, to remove said stop arm from the tail piece 107$^a$ of the upper pawl, and permit said pawl to drop into engagement with the constantly rotating ratchet 106. The ratchet now rotates the shaft 95, and revolves the bunch-ejecting arms until the tail piece of the acting pawl abuts against a fixed stud 117, which displaces the pawl from engagement with the ratchet, whereupon the rotation of the shaft 95, and the revolution of the ejecting arms cease, one of the arms 103 being left in position to act on a bunch of laths in a succeeding pair of benches.

A bunch trimmed by the saws drops upon a horizontal conveyor belt 118 (Figures 1 and 3), and is delivered thereby at any desired point.

It will now be seen that an operator stationed in position to control the treadle 28, is enabled to stop and start the series of benches at will, and to insert a bunch of laths in the pair of benches nearest his station while the bunches are at rest. When the benches are started, the inserted bunch is positioned while passing between the ram 43 and the gage plate 43$^a$.

When the benches have moved sufficiently forward from the ram and gage plate, the bunch is compressed, and the binding wires are applied thereto without stopping the benches. When the benches reach the horizontal delivering position their motion is stopped while the bunch is being ejected and trimmed by the saws, after which the benches are again started. The operation is thus continued indefinitely.

It is obvious that the machine is adapted for use in treating edgings and other equivalent articles.

It will be seen that a bunch compressed by the jaws may be bound by wire or other ligatures secured by hand, in which case the jaws will not necessarily be formed as magazines.

The benches and the intermediate chain sections collectively constitute an endless carrier, adapted to engage sprocket wheels whereby the carrier is driven. The positive engagement of the links of the chain sections with the teeth of the sprocket wheels, the engagement of the ears or runners 37 of the benches with the horizontal guides 38, and the positive engagement of the notches 36 in the recesses of the bench bases, with the teeth of the sprocket wheels, which enter the said recesses when the benches project horizontally, ensure accurate control of the endless carrier by the sprocket wheels, sagging of the upper stretcher of the endless carrier being prevented by the said runners and guides. The recesses 35 in the bench bases ensure an extended bearing of the said bases on the sprocket wheels fixed to the shaft 18$^a$, so that the horizontally supported benches are firmly supported by the sprocket wheels. This is true, whether the recesses are provided with the notches 36 or not. Although I prefer to provide said notches, because they constitute sprocket teeth-engaging members occupying the gaps between the chain sections 34, I do not limit myself however to the notches, and may depend for the positive engagement between the endless carrier and the sprocket wheels on the cooperation of the chain sections with the sprocket wheels. The recesses 35 in the bench bases may, therefore, be formed to have an extended bearing on the outer ends of the sprocket-wheel teeth, without being notched to receive said teeth.

I claim:

1. A bunching machine comprising an endless conveyor, including spaced apart rigid benches, arranged in pairs and having recessed bases provided with runners, and flexible sprocket chain sections connecting the bases of the benches, a driven shaft at one end portion of the conveyor, a loose shaft at the opposite end portion of the conveyor, sprocket wheels fixed to said shafts and arranged to hold said conveyor, so that the bench bases and the chain sections include upper and lower stretches, from which some of the benches project vertically, and intermediate portions crossing the sprocket wheels, the benches on the upper stretches upstanding therefrom, fixed guides supporting the runners of the upstanding benches; and driving means connected with the said driven shaft, and including a clutch controlled by the operator, whereby the carrier may be started and stopped, the arrangement being such that the chains may be stopped when some of the benches upstand from the upper stretch to receive and act on groups of units inserted therein, and other benches project horizontally to permit the delivery of a bunch of said units, the recesses in the bench bases being formed to have an extended bearing on two of the sprocket wheels, so that the horizontally projecting bases are firmly supported by said sprocket wheels when the benches project horizontally.

2. A bunching machine comprising a plurality of pairs of bunch-receiving benches, having recessed and notched rigid bases provided with runners; flexible chain sections connecting said bases, and forming therewith two endless sprocket chains, portions of which are inflexible; a driven shaft and a loose shaft journaled in fixed bearings; sprocket wheels fixed to said shafts and so engaging said chains that the chains include upper and lower stretches from which some of the benches project vertically, and intermediate portions crossing the sprocket wheels, the benches on the upper stretches upstanding therefrom; fixed guides supporting the runners of the upstanding benches; and driving means connected with said driven shaft, and including a clutch controlled by the operator, whereby the chains may be started and stopped, the arrangement being such that the chains may be stopped when the benches of a plurality of pairs upstand from the upper stretch to receive and act on groups of units inserted therein, and the benches of another pair project horizontally to permit the delivery of a bunch of said units.

3. A bunching machine substantially as specified by claim 1, including bunch-compressing jaws carried by said benches, and jaw-closing and opening mechanism operable by a progressive movement of the upstanding benches, to first compress bunches of units therein, preparatory to the application of binding ligatures to the bunches, and to subsequently release the bound bunches.

4. A bunching machine substantially as specified by claim 1, including bunch-compressing jaws carried by said benches, and jaw-closing and opening mechanism operable by a progressive movement of the upstanding benches, to first compress bunches of units therein, preparatory to the application of binding ligatures to the bunches, and to subsequently release the bound bunches, said jaws being formed as magazines adapted to hold binding wires, and provided with means operable by the said mechanism to interengage hooks with eyes formed on the ends of the binding wires.

5. A bunching machine substantially as specified by claim 1, comprising also a fixed gage plate at one side of the path of the said upstanding benches, a movable ram at the opposite side of said path, and mechanism operable by a progressive movement of the upstanding benches to project and retract the ram, and position bunches of units in the upstanding benches.

6. A bunching machine comprising a series of bunch-carrying benches, means for moving said benches in an endless path, the arrangement being such that each bench is alternately in a receiving and a delivering position, a pair of rotary cutting-off saws, adjacent to a bench held in delivering position, and ejecting mechanism adapted to force a bunch from said bench, and fixed guides arranged to direct an ejected bunch across the saws.

7. A bunching machine comprising a series of bunch-carrying benches, means for moving said benches in an endless path, the arrangement being such that each bench is alternately in a receiving and a delivering position, a pair of rotary cutting-off saws, adjacent to a bench held in delivering position, and two pairs of revolubly mounted arms having angular bunch-engaging end portions, adapted to force bunches from a bench in delivering position, fixed guides arranged to direct a bunch across the saws, and mechanism for intermittently revolving said arms, the arrangement being such that each pair of arms is adapted to force a bunch along said guides until the ends of the bunch are trimmed, and is arrested in a depressed inoperative position, the other pair of arms being at the same time arrested in a raised operative position.

8. A bunching machine comprising a series of bunch-carrying benches, means for moving said benches in an endless path, the arrangement being such that each bench is alternately in a receiving and a delivering position, a pair of rotary cutting-off saws, adjacent to a bench held in delivering position, and two pairs of revolubly mounted arms having angular bunch-engaging end portions, adapted to force a bunch from a bench in delivering position, fixed guides arranged to direct a bunch across the saws, and mechanism for intermittently revolving said arms, the arrangement being such that each pair of arms is adapted to force a bunch along said guides until the ends of the bunch are trimmed, and is arrested in a depressed inoperative position, the other pair of arms being at the same time arrested in a raised operative position, said mechanism including a worm gear, continuously rotated independently of said arms by connections with the said shaft, a ratchet fixed to said gear; pawls revoluble with said arms, and means operable by a movement of a pair of benches to delivering position, to connect one of the pawls with the ratchet, to cause a partial revolution of the arms, means being provided for disconnecting said pawl from the ratchet at a predetermined point, and thus stop the revolution of the arms.

9. A bunching machine comprising a pair of benches located abreast of each other, means for progressively moving said benches in unison, pairs of compressing jaws carried by the benches, said jaws having crossed arms, springs normally holding the jaws opened, oscillatory arms pivoted to the benches, means carried by a progressive movement of the benches to depress said arms, and connections between said arms and the jaws organized to close the jaws when the oscillatory arms are depressed, said arms being raised by the springs when the jaws are opened.

10. A bunching machine comprising a pair of benches located abreast of each other, means for progressively moving said benches in unison, pairs of compressing jaws carried by the benches, said jaws having crossed arms, springs normally holding the jaws opened, oscillatory arms pivoted to the benches, fixed means carried by the frame of the machine to oscillate said arms, connections between said arms and the jaws organized to close the jaws when the oscillatory arms are depressed, said arms being raised by the springs when the jaws are opened, the said jaws being formed as magazines, adapted to hold a group of binding wires, and provided with side springs, adapted to bear on opposite sides of said group, and permit the withdrawal of the innermost wire from the magazine, and with radially acting springs adapted to exert inward pressure on the wires, one of the jaws of each pair being provided with a head adapted to exert inward pressure on one end of a binding wire when the jaws are closed.

11. A bunching machine substantially as specified by claim 10, said jaws being composed of inner sections and outer sections slidable on the inner sections to vary the length of the jaws, means being provided for confining the outer sections in any position to which they may be adjusted.

In testimony whereof I have affixed my signature.

HENRY PEASE.